United States Patent
Hundal et al.

(10) Patent No.: US 9,369,246 B2
(45) Date of Patent: Jun. 14, 2016

(54) SYSTEM AND METHOD OF ENHANCING WIFI REAL-TIME COMMUNICATIONS

(75) Inventors: Sukhdeep S. Hundal, Surrey (CA); Daniel Roodnick, North Delta (CA); Bennett Cheng, Vancouver (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 1509 days.

(21) Appl. No.: 11/643,918

(22) Filed: Dec. 22, 2006

(65) Prior Publication Data

US 2007/0165593 A1 Jul. 19, 2007

Related U.S. Application Data

(60) Provisional application No. 60/754,604, filed on Dec. 30, 2005.

(51) Int. Cl.

| | |
|---|---|
| *H04W 24/02* | (2009.01) |
| *H04L 1/00* | (2006.01) |
| *H04L 5/00* | (2006.01) |
| *H04W 80/00* | (2009.01) |
| *H04W 84/12* | (2009.01) |

(52) U.S. Cl.
CPC ............ *H04L 5/0037* (2013.01); *H04L 1/0072* (2013.01); *H04L 1/0083* (2013.01); *H04W 24/02* (2013.01); *H04W 80/00* (2013.01); *H04W 84/12* (2013.01)

(58) Field of Classification Search
CPC ..... H04W 24/02; H04W 74/04; H04W 72/12; H04W 74/02; H04W 74/0866; H04W 74/0808
USPC ................. 370/349, 329, 341, 412, 431, 468; 455/423, 450
See application file for complete search history.

(56) References Cited

U.S. PATENT DOCUMENTS

| | | |
|---|---|---|
| 7,110,380 B2 | 9/2006 | Shvodian |
| 7,346,077 B2 | 3/2008 | Tourunen et al. |

(Continued)

FOREIGN PATENT DOCUMENTS

| | | |
|---|---|---|
| DE | 101 33 518 A1 | 1/2003 |
| EP | 1 548 990 | 6/2005 |
| WO | WO 2005/034416 | 4/2005 |

OTHER PUBLICATIONS

German Office Action w/ English Translation, Sep. 16, 2009.

*Primary Examiner* — George Eng
*Assistant Examiner* — Jing Gao
(74) *Attorney, Agent, or Firm* — Steptoe & Johnson LLP

(57) ABSTRACT

Systems and methods of enhanced real-time communications between WiFi devices. In one embodiment of the present invention a method for enhanced payload protection in a WiFi system includes transmitting multiple copies of data packets in successive frame body transmissions. In another embodiment, a method for enhanced communications over a WiFi link includes examining a unit ID packet to determine a destination of a data payload when errors are detected in IP and/or MAC headers. If a destination is determined, the packet is corrected and forwarded to the device based on the unit ID determination. In another embodiment, a method for enhanced real-time communications in a WiFi network includes establishing a communications frame that includes an active timeslot, preferably based on U-APSD, for a WiFi device to use for transmission of successive audio data packets transmitted between the WiFi handset and AP.

14 Claims, 8 Drawing Sheets

(56) References Cited

U.S. PATENT DOCUMENTS

| | | |
|---|---|---|
| 7,924,765 B2 | 4/2011 | Chen et al. |
| 8,089,892 B2 | 1/2012 | Liu et al. |
| 2002/0025818 A1* | 2/2002 | Kang et al. ............... 455/450 |
| 2002/0159544 A1* | 10/2002 | Karaoguz ............... 375/329 |
| 2003/0003905 A1* | 1/2003 | Shvodian ............... 455/423 |
| 2003/0152059 A1* | 8/2003 | Odman ............... 370/338 |
| 2003/0161292 A1 | 8/2003 | Silvester |
| 2004/0072573 A1* | 4/2004 | Shvodian ............... 455/450 |
| 2004/0136393 A1* | 7/2004 | Riveiro Insua et al. ....... 370/432 |
| 2004/0179501 A1 | 9/2004 | Marsan et al. |
| 2004/0233869 A1 | 11/2004 | Uchida |
| 2005/0152358 A1 | 7/2005 | Giesberts et al. |
| 2005/0180402 A1 | 8/2005 | Heitmann |
| 2005/0249222 A1 | 11/2005 | van Kampen et al. |
| 2005/0249227 A1* | 11/2005 | Wang et al. ............... 370/412 |
| 2005/0254456 A1 | 11/2005 | Sakai et al. |
| 2006/0045136 A1 | 3/2006 | Rainbolt et al. |
| 2006/0193281 A1 | 8/2006 | Chen et al. |
| 2006/0256819 A1 | 11/2006 | Lum et al. |
| 2008/0043731 A1 | 2/2008 | Lim et al. |
| 2009/0067389 A1 | 3/2009 | Lee et al. |

* cited by examiner

SYSTEM AND METHOD OF ENHANCING WIFI REAL-TIME COMMUNICATIONS

This application claims the benefit of U.S. Provisional Application No. 60/754,604 filed Dec. 30, 2005, which is herein incorporated by reference in its entirety.

BACKGROUND

1. Field of the Invention

The present invention relates generally to wireless communications systems. More particularly, the present invention relates to systems for improved communications in wireless devices using WiFi communications links.

2. Background

Wireless communications technology affords users great flexibility in communications, including audio communications, email, video, and other data transfer. While cellular networks are deployed widely for convenient voice communications, use of data-intensive wireless communications has increased dramatically in recent years, in part due to the deployment of technology (such as WiFi) based on the 802.11 family of standards. The latter technology is particularly suited for users of data terminals such as portable computers who enjoy "portable" access to data networks through access points (APs), whether at home, in an office, hotel, school, or coffee shop.

Because 802.11 (the term "WiFi" is used interchangeably with "802.11" herein to indicate a wireless communications based on an 802.11 standard) technology has been developed to facilitate data communications, such as email, web access, and the like, a focus has been on assuring data transmission, while less attention has been paid to applications that involve real-time communications, such as audio and video transmission. Accordingly, 802.11-based devices have not been widely deployed as audio or video devices.

A first problem associated with the use of 802.11 for real-time applications is the use of a frame check sequence (FCS) included in a payload packet for determining whether to send an acknowledgment (ACK) for a particular transmitted payload packet. However, in real-time voice and streaming video applications, it is not possible to use an ACK mechanism.

Because every data packet is subject to an ACK mechanism in transmissions using the 802.11 standard, a large overhead is added to data transmissions. While desirable to ensure the reliability of data transmissions, this creates an often unnecessary transmission bottleneck for real-time applications. For example, in wireless transmission of data from a WiFi terminal to an access point (AP), if a single error is detected in the Media Access Control (MAC) header or payload of an 802.11 packet transmission, the packet is rejected. Rejection based on single errors may desirable in the case of data transmitted using internet protocol (IP), where the single error could be located in an IP address field, and could cause the packet to be improperly directed to the wrong IP address by the AP. However, single errors located in voice packets, for example, are often easily correctible or have negligible influence on the integrity of the communications. Thus, voice message transmission using WiFi technology often entails frequent retries initiated because of error detection, or loss of audio, resulting in inferior audio quality.

Additionally, 802.11 wireless terminals are susceptible to interference from other nearby RF devices. Because transmission occurs at a fixed frequency, frequency diversity cannot be deployed to avoid RF interference with another device operating at about the same frequency. Although a sequence of retries of transmission of an audio packet can be attempted to avoid interference using time diversity, the retries can have adverse consequences. For example, when two handset devices operating in close proximity each employ a series of retries to avoid external interference, the total frame time may exceed 10 ms and lead to unstable communications.

Accordingly, it will be recognized that a need exists to improve 802.11 communications for real-time applications.

SUMMARY OF THE INVENTION

In one embodiment of the present invention, a method for enhanced payload protection in a WiFi system includes receiving a first data packet in a buffer. The first data packet and a second data packet are transmitted in a first frame body between a WiFi terminal and access point (AP). The first data packet and a third data packet are transmitted in a second frame body between the WiFi terminal and AP. By repeating the above steps for other data packets in the above manner, two copies of each data packet can be sent between the WiFi terminal and AP. The two copies are received in a buffer. A determination is made as to a best copy of the two copies and the best copy of the two copies is forwarded to a receiver.

In another embodiment of the present invention, a method for enhanced payload protection in a WiFi system includes a step of storing a data packet in a buffer. An FEC packet based on the data packet is also stored in the buffer. The Data packet and FEC packet are transmitted between a WiFi terminal and an AP. The FEC packet is applied to the data packet to produce a corrected data packet. The corrected data packet is forwarded to a receiver.

In another embodiment of the present invention, a method for enhanced communications over a WiFi link includes transmitting a data payload over a first payload. An error is detected using an FCS packet. The data payload is sent to a packet correction layer. The packet correction layer determines the nature of the error. In one embodiment of the present invention, if it is determined that an error exists in the IP and MAC fields, the packet correction layer examines a unit ID packet to determine a destination of the data payload. If a destination is determined, the packet is corrected and forwarded to the device based on the unit ID determination.

In another embodiment of the present invention, a method for enhanced communications in a WiFi network includes a step of establishing a frame characterized by a frame interval for transmission of successive audio data packets transmitted between a WiFi handset and AP. A registration from the WiFi handset is received. An active timeslot for transmission of audio data packets between the WiFi handset and AP is arranged within the frame. A trigger from the WiFi handset is received. Data is delivered to the handset and received from the handset, wherein the active timeslot is configured to avoid overlap with active timeslots arranged for other WiFi devices in active communication with the AP.

DETAILED DESCRIPTION OF THE INVENTION

Figure 1:
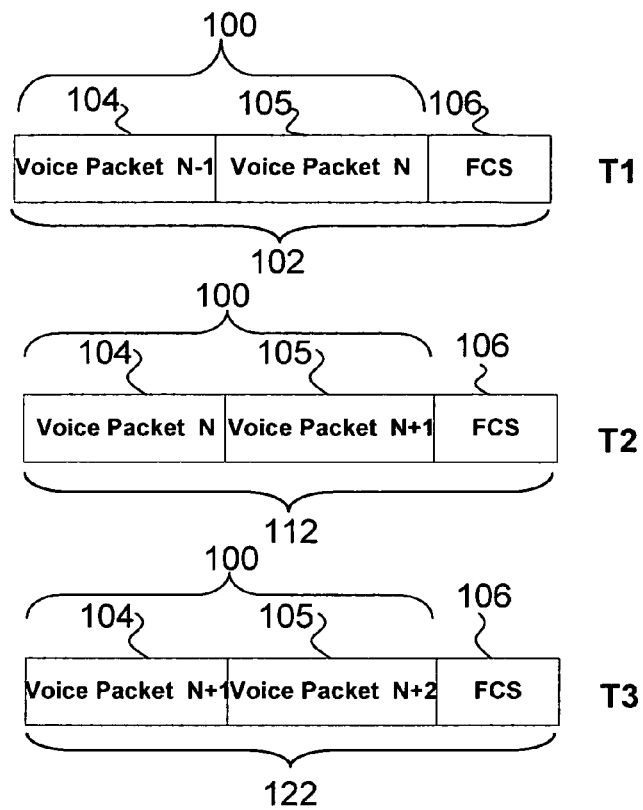
FIG. 1 illustrates one exemplary data payload (frame body) structure that is used in transmission of successive 802.11 payload packets, according to an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

In an 802.11 payload packet used to transmit standard data a frame check sequence (FCS) packet is inserted together with a frame body (payload) in the payload packet. The FCS is used in conjunction with an acknowledgment mechanism to determine whether to send the payload packet. In standards such as 802.11e that are geared toward real-time data transmission, no acknowledgement mechanism is supported. Accordingly, real-time voice or streaming video may be sent without any FCS. The quality of such transmissions can therefore be less than ideal.

FIG. 1 illustrates one exemplary data payload (frame body) structure 100 that is used in transmission of successive 802.11 payload packets, according to an embodiment of the present invention. At time T1, frame body structure 100 is included in 802.11 payload packet 102, which can include header and other address fields (not shown). Payload packet 102 can be transmitted from a WiFi handset to a wireless AP, for example. In one embodiment of the present invention, frame body structure 100 is a dual voice packet structure that includes voice packet slot 104 and voice packet slot 105. As depicted, voice packet slots 104 and 105 contain consecutive voice packets received in a buffer. At time T1, for example, voice packets N and N−1 are included in frame body 100 of 802.11 payload packet 102. After payload packet 102 is received at the wireless AP, voice packets N and N−1 can be stored locally in the AP. At time T2, voice frame body structure 100 of payload packet 112 includes voice packets N and N+1. Voice packet N+1 can be a voice packet transmitted consecutively after voice packet N to a buffer. Both voice packets N and N+1 can then be transmitted at time T2 to the wireless AP in payload packet 112. Likewise, at time T3, voice packets N+1 and N+2 are transmitted in frame body 100 of 802.11 payload packet 122. Accordingly, each voice packet can be transmitted twice to the wireless AP in successive 802.11 payload packets. By separating in time the transmission of nominally identical voice packets, dual packet frame body structure 100 provides a mechanism to increase the probability that at least one of the two nominally identical voice data packets is sent without error, especially in the presence of interference where error generation in any given packet can occur. Accordingly, the receiving device, such as an AP, can then determine which of the two copies of a given voice packet to transmit to a receiver for playing.

Figure 2:
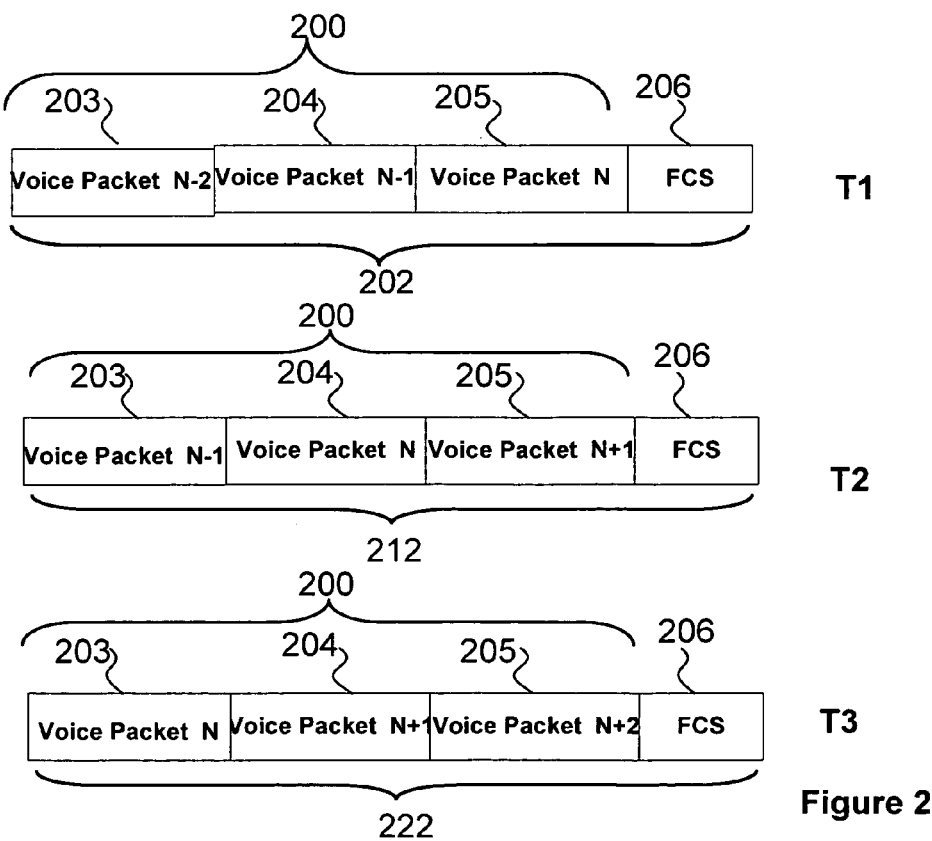
FIG. 2 illustrates a three-data packet frame body structure, according to another embodiment of the present invention.

FIG. 2 illustrates a three data packet frame body structure 200 according to another embodiment of the present invention. In this case, the operation of frame body structure 200 is illustrated by inclusion of redundant data packets in a series transmitted 802.11 payload packets using payload slots 203, 204, 205. Within each 802.11 payload packet, frame body structure 200 includes three different data packets, for example, voice data packets. The operation of frame body structure 200 is analogous to that of frame body structure 100, except that instead of sending each voice data packet twice, each voice data packet is sent thrice. Thus, for example, voice data packet N is sent consecutively at times T1, T2 and T3 in 802.11 payload packets 205, 204, and 203, respectively. The three copies of each voice payload packet can be stored in a buffer of a receiving device, and the best copy can be accepted for transmission to a receiver.

In other embodiments of the present invention, the data packets can be video or other types of data.

Figure 3:
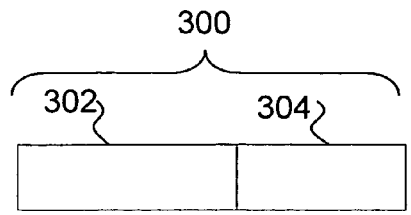
FIG. 3 illustrates an exemplary frame body arranged according to another embodiment of the present invention.

FIG. 3 illustrates an exemplary frame body 300 arranged according to another embodiment of the present invention. Frame body 300 includes data packet 302 and forward error correction (FEC) packet 304. Data packet 302 can be, for example, a voice packet or video packet. When a device (not shown) transmits data packet 302 as part of an 802.11 payload packet (not shown), the transmitter can calculate FEC bits based on data packet 302 and a given algorithm, and append the FEC bits as packet 304 to the data.

A receiver of 802.11 payload packet can then use the algorithm and the received FEC packet 304 to perform error corrections, if necessary, on the data packet 302.

Figure 4:
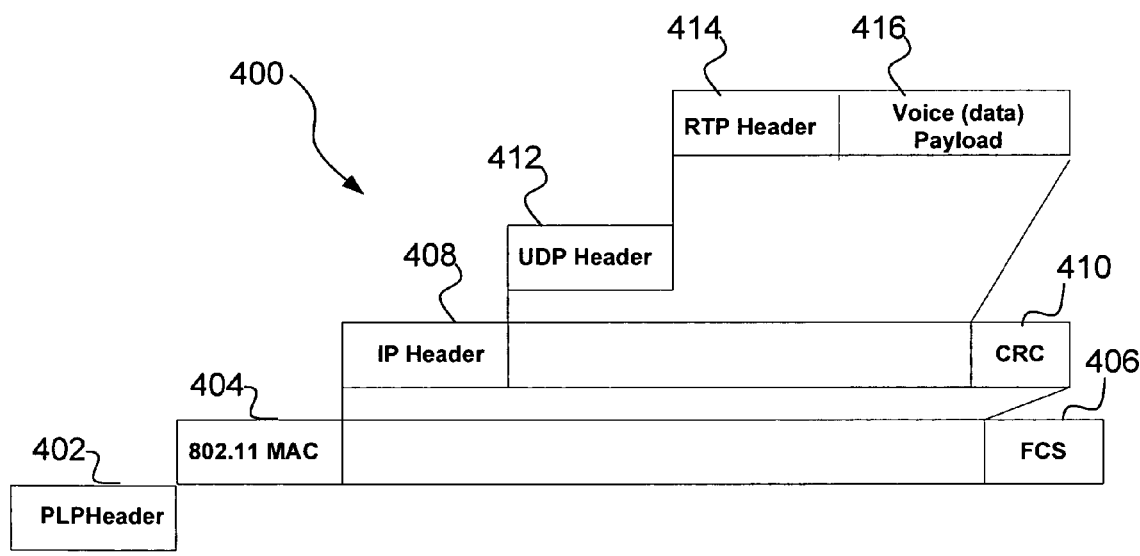
FIG. 4 illustrates a reference IP packet that can be used to transmit voice or other data from a transmitter using 802.11 protocol, where the data is to be sent over an IP network.

FIG. 4 illustrates a reference IP packet 400 that can be used to transmit voice or other data from a transmitter using an 802.11 protocol, where the data is to be sent over an IP network. IP packet 400 includes physical layer header 402, MAC header 404, FCS 406, as well as IP header 408, CRC 410, UDP header 412, RTP header 414, and data payload 416. In a conventional implementation, when a transmitting device sends voice data, for example, an 802.11 WiFi handset used to transmit voice in a voice-over-internet-protocol (VOIP) call, the voice data is packaged as payload 416 within packet 400 and sent over a wireless link to a receiver, such as an AP. When the packet is received, the AP checks packet 400, and if no errors are found, forwards the packet for transmission over an IP data network. As described below, errors are detected in conventional 802.11 transmission using FCS. FCS generally involves extra checksum characters that are added in a frame for error detection and correction. The sending device computes a checksum on the entire frame and sends this along. The receiving device computes the checksum on the received frame using the same algorithm, and compares it to the received FCS. In this manner, the receiver can detect whether any data was lost or altered in transit. In conventional implementation, any error detected in packet 400 by a receiving AP will cause the entire packet to be rejected.

The 802.11 MAC header 404 generally comprises a destination address for the packet, as well as a source address, which is the unique address of the sending device. In addition, IP header 408 contains the terminal device IP address. Accordingly, any errors in the IP or MAC headers could cause failure of delivery of packet 400 to the right address. Thus, in conventional 802.11 protocol, rejection of packet 400 precludes delivery of packets to the wrong address.

However, the single bit error rejection comes at a cost. The location of a bit error is not determined in the FCS process. Accordingly, a rejected IP packet, such as packet 400, could contain an error in any field, for example, voice payload 416, or MAC header 404. In the latter field, rejection of the packet prevents possible improper packet delivery. But a single error in voice payload 416 is unlikely to cause delivery problems, and may present no significant degradation in the quality of voice data contained therein. Yet, the entire packet 400 is rejected, leading to the need to resend the voice data, and possible degradation of audio quality during a VOIP call.

Figure 5:
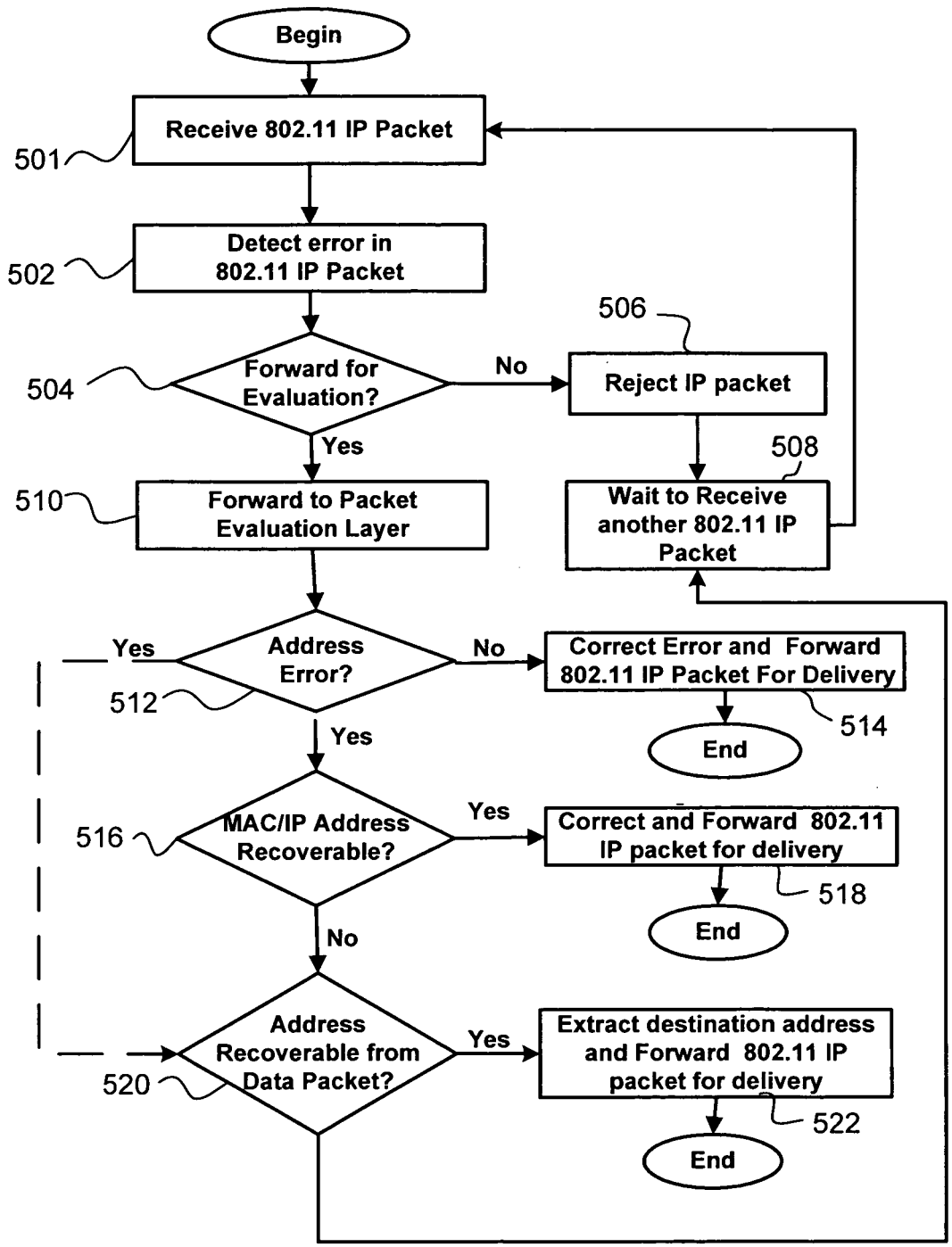
FIG. 5 illustrates exemplary steps in a method for improving an 802.11 link according to one embodiment of the present invention.

FIG. 5 illustrates exemplary steps in a method for improving an 802.11 link according to one embodiment of the present invention. In step 501, an 802.11 IP packet is received over an air interface at a receiving device, such as an AP. The IP packet contains a data packet payload, for example, a voice data packet.

In step 502, an error is detected in an 802.11 IP packet. For example, an AP using an FCS field in the received packet detects that the 802.11 IP packet as received contains errors.

In optional step 504, the receiving unit determines whether to forward the 802.11 IP packet for further evaluation. In one embodiment of the present invention, the process moves directly from step 502 to step 510 below. In other words, the receiving unit, for example, an AP, automatically determines to forward all packets received with errors for further evaluation. In another embodiment of the present invention, screening of the incoming 802.11 IP packet is performed by the receiving device. For example, based on MAC filtering or a similar procedure, an AP can determine whether the 802.11 IP packet was received from a known (registered) WiFi handset. The AP may be preconfigured to only process errors in packets received from registered devices. Accordingly, if the handset not registered, the process moves to step 506.

In step 506, the received IP packet containing errors is rejected.

In step 508, the receiver waits to receive another 802.11 IP packet. For example, the sending device can resend a copy of the voice data packet contained in the first 802.11 IP packet. The process can then return to step 501.

If, in step 504, the handset is registered, then the process moves to step 510.

In step 510, the 802.11 IP packet with errors is forwarded to a packet evaluation layer. The packet evaluation layer (PEL) can be software that is executed by a processor in the AP.

In step 512, the PEL operates to determine the location and nature of the error or errors in the received 802.11 IP packet. For example, the PEL may determine that the error is a non-address error. The term "non-address error" denotes an error in the 802.11 packet located outside of the IP or MAC headers. If the error is a non-address error, the process moves to step 514 where error corrections to non-address errors are performed before delivery of the payload.

In step 512, if an "address error" is detected, that is, one occurring in the IP or MAC headers, the process moves to step 516.

In step 516, the receiver (AP) determines if any address information is recoverable from the MAC and/or IP headers, such that the 802.11 packet can be transmitted properly. If so, then the process moves to step 518 where the 802.11 packet is forwarded for delivery to the IP network.

In step 516, if the receiver determines that errors in the MAC and IP header information preclude proper delivery of the 802.11 packet, the process moves to step 520.

Figure 6:
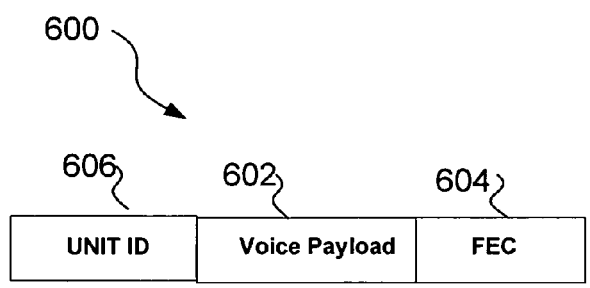
FIG. 6 illustrates an exemplary 802.11 data packet payload, according to one embodiment of the present invention.

In step 520, the data packet payload is evaluated to recover address information. In a preferred embodiment of the present invention, the data packet payload contains a data packet, and FEC packet, and a UNIT ID packet. The data packet can be a voice packet or video packet, for example. FIG. 6 illustrates an exemplary 802.11 data packet payload 600, according to one embodiment of the present invention. Payload 600 contains voice payload 602, FEC packet 604 and UNIT ID packet 606. FEC packet 604 performs forward error correction on UNIT ID packet 606 to ensure that bits contained in the UNIT ID are unlikely to suffer a transmission error. UNIT ID preferably contains information that uniquely identifies the 802.11 receiving device that is to receive the 802.11 IP packet. Thus, in step 520, the UNIT ID packet can be used to determine the destination of the 802.11 IP packet even if the IP and MAC headers have been corrupted. After determining the correct address, the process moves to step 518, where the data packet is forwarded for transmission to the destination device. If the address is determined not to be recoverable, the process moves to step 508.

In another embodiment of the present invention, the process moves directly from step 512 to step 520. In other words, if an address error in an IP or MAC header is detected, the AP moves directly to determine if address information can be recovered from the data packet payload.

Because conventional 802.11 standard does not allocate specific slots for transmission of data between devices, it is difficult to ensure that interference is minimal for WiFi systems that employ multiple devices in close proximity. However, in real-time applications such as WiFi cordless phones (handsets), it is desirable to be able to operate more than one WiFi handset of a system in close proximity where mutual interference may be a problem. In addition, it is desirable to ensure that data transmission is optimal in the presence of other RF interferers. Thus, it is desirable to be able to preserve the ability to retransmit data, as provided for in the conventional 802.11 standard. However, because handsets are typically battery powered, it is undesirable for a WiFi handset to have to maintain continuous full power operation to monitor for incoming data packets for longer than necessary.

Figure 7A:
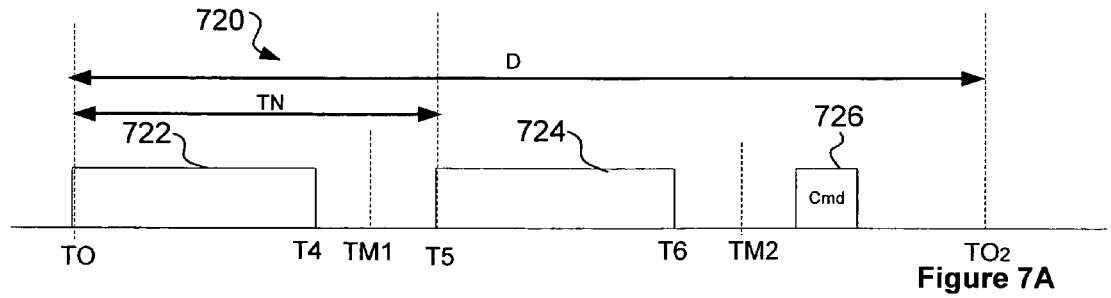
FIG. 7A illustrates an exemplary frame structure, in accordance with another embodiment of the present invention.
Figure 7B:
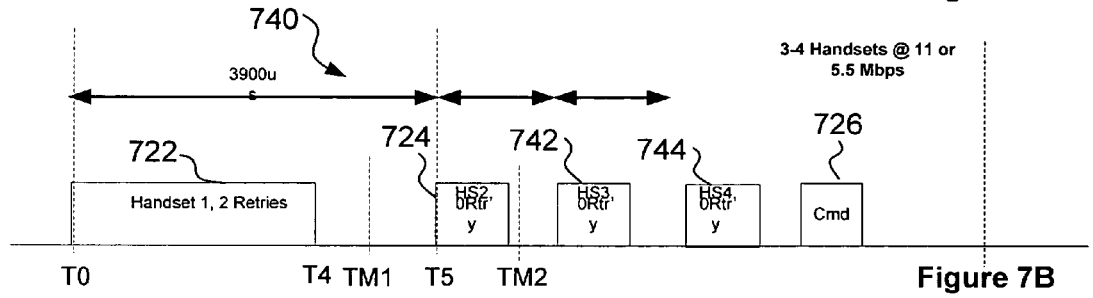
FIG. 7B illustrates an exemplary frame structure arranged in accordance with another embodiment of the present invention.
Figure 7C:
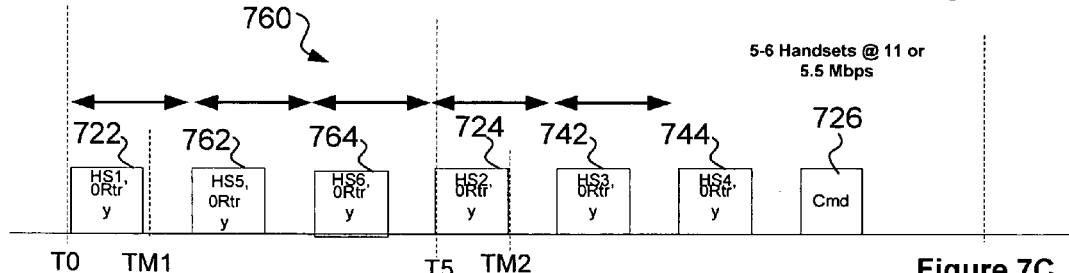
FIG. 7C illustrates a frame structure that adds two handset active slots to that depicted in FIG. 7B.
Figure 7D:
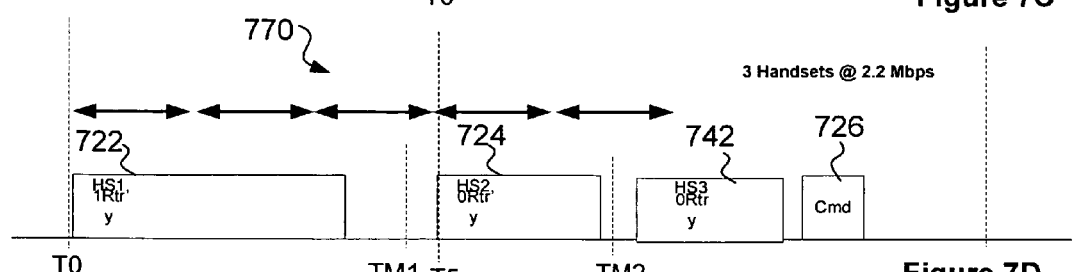
FIG. 7D illustrates a frame structure that corresponds to a scenario in which an extra handset active slot is added to two previously active handset slots in the case where the data transmission rate is also drastically reduced.
Figure 7E:
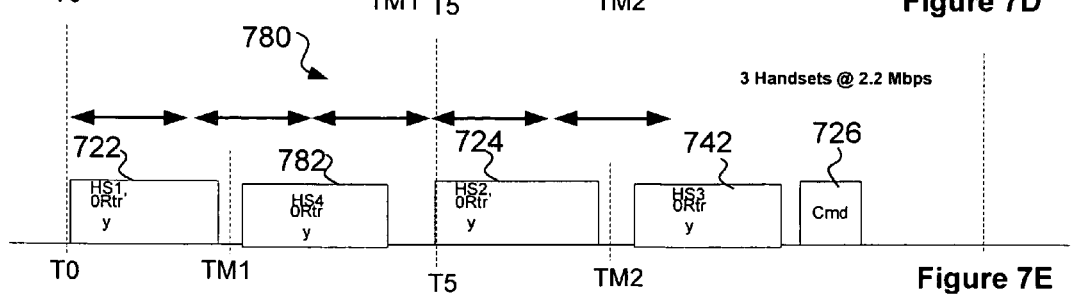
FIG. 7E illustrates a frame structure that adds a fourth handset active slot in the case of a lower data transmission rate, as illustrated in FIG. 7D.
Figure 7:
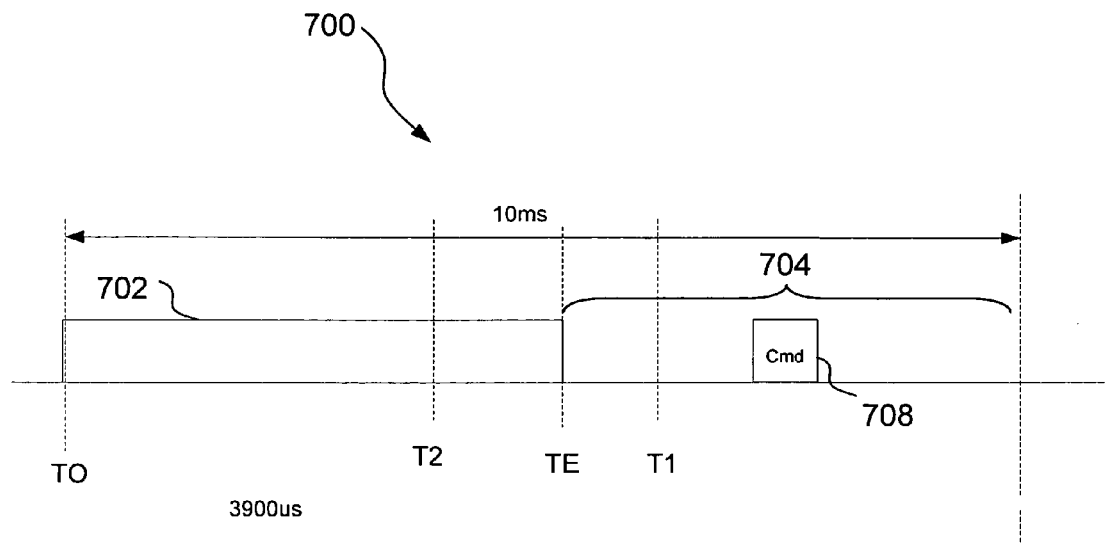
FIG. 7 illustrates an exemplary frame structure for enhanced WiFi communications, according to one embodiment of the present invention.

FIG. 7 illustrates an exemplary frame structure 700 for enhanced real-time WiFi communications, according to one embodiment of the present invention. The duration of frame structure 700 corresponds to a fixed and continuously repeating interval that can be established by an AP and used to establish 802.11 links with WiFi terminals, such as handsets. In other words, a WiFi system employing frame structure 700 operates to generate a continuous series of repeating frames having the frame structure 700 in which a second frame begins at the time when a first frame ends. For example, if the duration of frame structure 700 corresponds to 10 ms, during a one minute voice communication data can be transmitted over a series of 6000 consecutive data frames each having the structure of frame structure 700. In one embodiment of the present invention, frame structure 700 is used to establish communication links with WiFi handsets for voice communications, but could also be used for real-time video or other real-time communications. The time interval that defines frame structure 700 can be communicated to any WiFi handset associating with the AP. In one embodiment of the present invention, as illustrated in FIG. 7, the time interval is 10 ms, but can be 20 ms or another convenient duration. By establishing a fixed duration for frame structure 700, an AP can facilitate simultaneous communications with more than one WiFi handset, as described further below.

Frame structure 700 includes handset active slot 702. The term "handset active slot" or "active slot" corresponds to a time interval during which a designated WiFi handset that is associated with the AP can maintain an "active" state where full power of the handset can be employed. During the active state, the handset can, for example, receive data, send data, and actively listen for data. In one embodiment of the present invention, after a handset associates with an AP employing frame structure 700, the AP can establish communications with the handset using frame structure 700 and an active slot can be assigned to the handset as described below.

Figure 8:
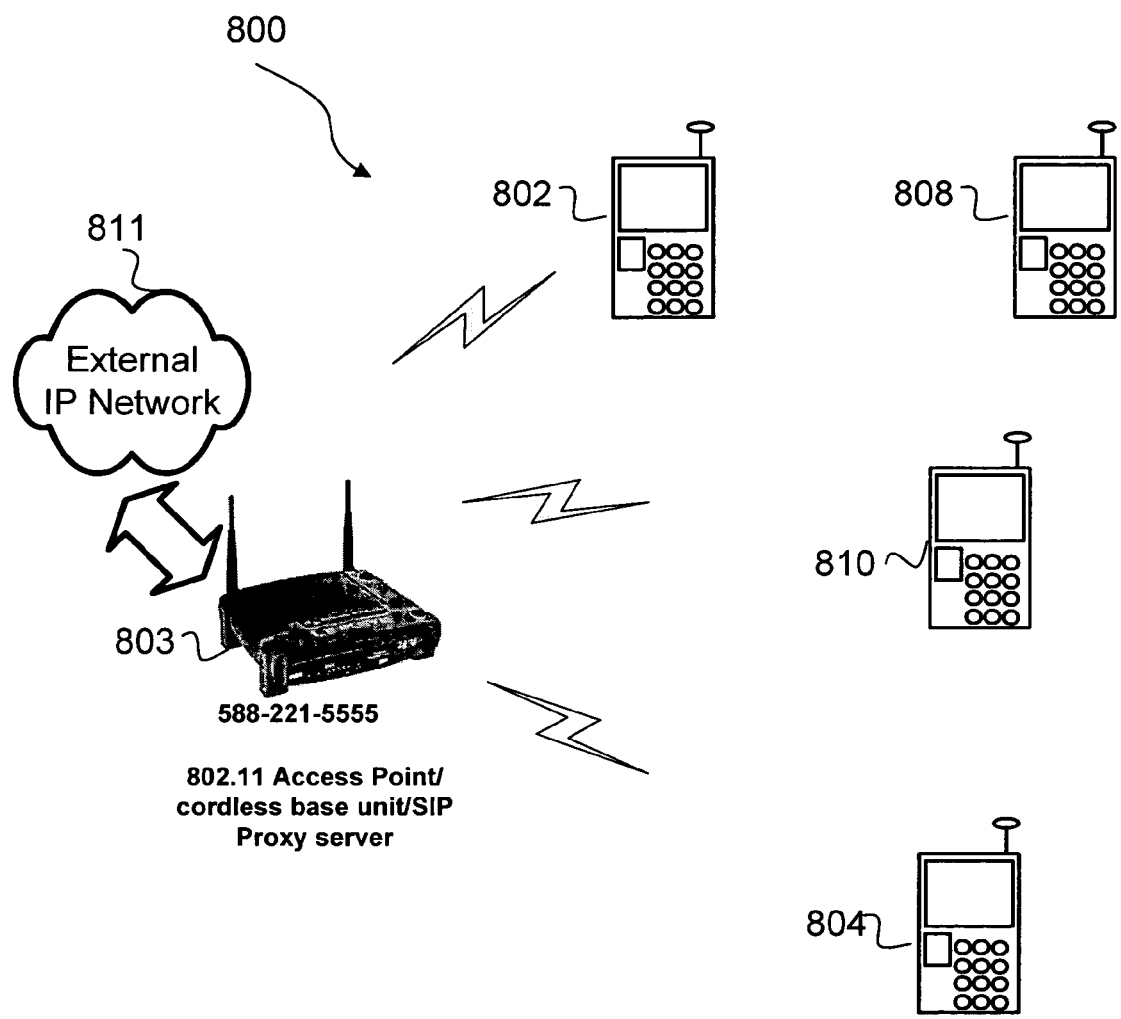
FIG. 8 depicts a WiFi system arranged in accordance with one embodiment of the present invention.

Referring to FIG. 8, which depicts a WiFi system 800 arranged in accordance with one embodiment of the present invention, WiFi handset 802 can power on and associate with AP 803, which is connected to IP network 811. Upon power on and registration of handset 802, AP 803 can establish a conventional 802.11 communications mode, with handset 802. In the conventional communications mode a periodic beacon is sent, for example, every 600 ms, to indicate whether any buffered data is to be sent between AP 803 and WiFi handset 802. During conventional communications mode, the WiFi handset can send and receive data based on applications that do not have a substantial requirement for real-time communications.

In one embodiment of the present invention, when, after registration with an AP, a WiFi terminal, such as handset 802, requests initiation of a real-time 802.11 communications mode (or "real-time communications mode"), the AP activates a real-time communications mode by establishing a real-time communications frame structure with the requesting handset. Thus, AP 803 can respond to a request from handset 802 and forward the information necessary to use frame structure 700 for real-time communications. The request for real-time communications mode can be initiated by a WiFi device user employing a user interface such as a button or keypad on the WiFi device. The button could be a "phone" button that when depressed indicates that the device is going "off-hook" to participate in a telephone call. Alternatively, a button to receive streaming audio, MPEG, etc. from an AP could also be used to initiate a real-time communications mode. Referring again to FIG. 8, upon initiation of a real-time communications mode, AP 803 then assigns active slot 702 to handset 802. When real-time communications mode is initiated, during each frame 700, handset 802 is active substantially only within frame 702. During "sleep period" 704, for example, a handset that is active in active slot 702 remains at low or standby power. In one embodiment of the present invention, the arrangement of active slot 702 and sleep period 704 is based on an Unscheduled Automatic Power Save Delivery (U-APSD) protocol. For example, when a handset such as handset 802 registers with AP 803, it can indicate that is wishes to enable U-APSD.

Figure 9:
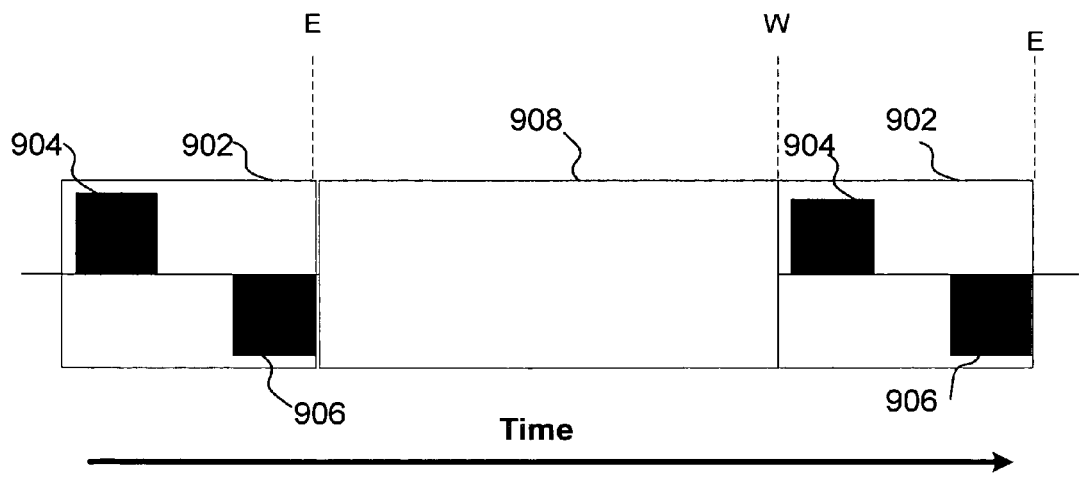
FIG. 9 illustrates one implementation of U-APSD.

FIG. 9 illustrates one implementation of U-APSD. In active slots 902, a given handset can operate at full power. During uplink transmission slot 904, the handset can send data and during downlink transmission slot 906 the handset can receive data from an AP. At time E, a sleep trigger time, the handset receives an end of service period (EOSP) bit that triggers the handset to initiate a reduced power mode ("go to sleep"), which persists throughout standby slot 908 until time W, at which point the handset resumes active operation.

Thus, in one embodiment of the present invention, the general U-APSD method illustrated in FIG. 9 is applied to frame 700 to produce active slot 702 and sleep period 704. For example, if handset 802 is assigned to slot 702, interval 902 corresponds to active slot 702 and standby power interval 908 corresponds to sleep period 704. At time T0 of every frame 700, handset 802 wakes up. The wakeup time T0 can be established, for example, when handset 802 initiates a request for real-time communications with AP 803. The AP can set the duration of frame 700 and instruct handset 802 to wake up at time T0 of each frame. Handset 802 can store this information, and based on an internal clock, handset 802 can subsequently wake itself up every 10 ms, for example. In one embodiment of the present invention, the termination of active slot 702 at time TE occurs when a handset, e.g., handset 802, receives an EOSP bit from AP 803. Accordingly, handset 802 is inactive during each frame for a period corresponding to interval 704.

In a preferred embodiment of the present invention, the duration of active slot 702 can extend from time T0 to T1, which represents a maximum duration of an active period for a handset assigned to slot 702. For example during initiation of a real-time communications mode of handset 802 with AP 803, AP 803 assigns a start of a wake up period at time T0 of each frame and sets a default "go to sleep" time at T1. If handset 802 has not received an EOSP bit (or other trigger to end the active state) from AP 803 by time T1, the handset nevertheless initiates a power down to inactive state. For example, the handset could send dummy data to a CODEC to simulate receipt of an EOSP bit followed by powering down of the device. If an EOSP bit is received before T1, for example, at TE or T2, then the inactive state begins for handset 802 at time T2, and continues during interval 704. Thus, interval 704 can vary for handset 802 in each frame.

In an enhanced mode of communications between and AP and WiFi handsets according to a preferred embodiment of the present invention, the duration of active slot 702 is arranged to allow a maximum amount of retransmissions (or "retries") of voice or other data, consistent with the amount of handsets actively communicating with the AP, the data transmission rate, and the need to transmit some control data. In other words, the duration of an active slot 702 is arranged to provide a maximum amount of retries for a handset associated with active slot 702 and to establish communications between an access point and any other active WiFi handsets without overlap in time between active slot 702 and any other slots arranged for communication with the other active handsets.

As in known, the 802.11 standard employs mechanisms for retries when needed. For example, frame structure 700 as depicted in FIG. 7 corresponds to a slot structure in which communications slots are arranged for a single handset in communication with an AP. In one embodiment of the present invention, frame structure 700 corresponds to a frame interval of 10 ms and the maximum duration of active slot 702 corresponds to an interval of about 6400 μs. Within active slot 702, based on a data transmission rate of 11 Mbps, 5 retries of audio data transmission can be performed, allowing for time for acknowledgement from the AP and wait time to receive an acknowledgement. Thus, if needed, a handset is allotted up to five retries within active slot 702 to transmit data to an AP. Upon successful transmission of a data packet, the handset can receive acknowledgment from the base AP and an EOSP bit if no further data is to be transmitted from the base unit. Thus, for example, at 11 Mbps, the duration in which a handset is awake within active slot 702 can vary from about 700 μs up to about 6400 μs, depending on the amount of retries needed to transmit a data packet.

Frame 700 further includes command slot 708 that is used to send a command packet between an AP and WiFi handset.

FIG. 7A illustrates frame structure 720, in accordance with another embodiment of the present invention. Frame structure 720 illustrates an arrangement having two handset active slots 722, 724 and command slot 726. In this arrangement, each active slot can be assigned to a separate WiFi handset to establish a regular active interval to communicate with a common AP. Thus, referring again to FIG. 8, handset 802 can register with AP 803, initiate a request for real-time communications, and be assigned active slot 722. Handset 804 can then register, request real-time communications mode, and be assigned handset active slot 724. Slots 722 and 724 are arranged so that they do not overlap in time. Accordingly, real-time communications between two WiFi handsets and a base unit can be maintained using the frame structure of FIG. 7A. For example, users of two WiFi handsets could maintain a voice call with a third party as well as hear each other. In other words, voice data that is transmitted to and from each WiFi handset could be buffered and transmitted at 10 ms intervals, for example, within their respective active slots, without mutual interference.

Preferably, the operation of handset active slots 722, 724 is in accordance with the principles described for handset active slot 702 of frame structure 700. Thus, in actual operation each slot 722, 724 can vary in duration up to a maximum active time set as default within any give frame.

In one embodiment of the present invention, the duration D of frame 720 is about 10 ms, and the duration of handset active slots 722 and 724 are equal. As depicted in FIG. 7A, time T5 corresponds to the start of handset active slot 724. In a preferred embodiment of the present invention, the time interval TN between the onset of active slots 722 and 724 is arranged to fulfill two criteria: In the first case, TN is made sufficiently long to accommodate a handset active slot 722 that can accommodate a maximum amount of data retries at a given data transmission rate for a first handset; secondly, the time T5 that marks the onset of a handset active period for a second handset is set for maximum adaptability to changed transmission conditions. In particular, T5 is set such that it does not need to be changed within frame 720 when the data transmission rate between handsets and AP is changed and/or when the additional handsets become active.

In a preferred embodiment of the present invention, time T5 is set within frame 720 such that the data transmission rate can be changed from 11 Mpbs to 5.5 Mbps to 2 Mbps, and the amount active of handsets increased up to six without changing the relative interval between T5 and T0.

By providing a fixed time for T5, the present invention operates to minimize the amount of disruption caused by the need to adjust the position of handset active time slots when conditions change. In one example where the duration of frame 720 is 10 ms, interval TN is about 3900 μs. Within an interval of 3900 μs, handset active slot 722 (as well as 724) having a duration of about 3100 μs, can be accommodated. This provides for two retries for a standard 640 bit voice packet transmitted at 11 Mpbs. In addition, the duration of handset active slot 722 (as well as 724) can be increased up to about 3700 μs, and still be accommodated within TI, which provides for two retries for a standard 640 bit voice packet transmitted at a 5.5 Mpbs. This is particularly advantageous when the transmission environment becomes noisier and creates more errors in transmission between a handset and base (AP), such that a lower transmission rate is desirable. Thus, referring again to FIG. 8, with the use of frame structure 720, transmissions between WiFi handsets 802, 804 and AP 803, can be changed from a rate of 11 Mbps to 5.5 Mpbs without any changes in the fixed points of the frame structure, T0 and T5. End times T4 and T6 of handset active slots 722 and 724, respectively, can be governed by the receipt of a EOSP bit as discussed above, in which case no extra information is needed from the AP. Additionally, as noted above, the default time setting for when an active handset would be put to sleep even if no EOSP bit is received, would be set at times TM1 and TM2. In this case, for 11 Mbps data transmission rate, default "go to sleep" times for TM1, TM2, could be set, for example, at 3100 μs after respective wake up times T0 and T5. At 5.5 Mbps data transmission rate, default "go to sleep" times for TM1, TM2, could be set, at 3700 μs after respective wake up times T0 and T5. In either case, no rearrangement of the slots within frame structure 720 is needed.

FIG. 7B illustrates an exemplary frame structure 740 arranged in accordance with another embodiment of the present invention. Frame structure 740 is used to illustrate handset active time slot allocation in the case where four WiFi handsets are actively communicating with an AP. Frame structure 740 includes exemplary handset active slots 722 and 724 of FIG. 7A. In this case, slot 722 maintains the same time interval as in the scenario depicted in FIG. 7A where only two WiFi handsets are allocated active slots. Thus, using FIG. 8 for illustration, if handset 802 is first to register with AP 803 and is assigned slot 722, in the scenario depicted in FIG. 7B, handset 802 is allocated active time that can accommodate 2 retries of data transmission at either 5.5 or 11 Mpbs for a 10 ms total duration of frame 720. Comparison of FIG. 7A to 7B illustrates that wake up times T0 and therefore T5 remain the same when the amount of active WiFi handsets increases from two to four. Thus, if handsets 802 and 804 represent the first and second registered handsets with AP 803, the wakeup times remain the same when new handsets 808, 810 are associated with AP 803. However, in this case the slot width of handset active slots 724 for handset 804, as well as that of slots 742 and 744 for handsets 808 and 810, are only sufficient for one attempt at data transmission with no retries. Thus, in this case, in order to accommodate communication with two extra WiFi handsets, only one timing change needs to be sent to the previously associated handsets, namely a new default go to sleep time TM2.

FIG. 7C illustrates a frame structure 760 that adds two handset active slots 762, 764 to the arrangements of slots depicted in FIG. 7B. The two new slots correspond to slots allocated to a fifth and sixth WiFi handset to associate with an AP. In this case, slot 722 for handset 802 is also adjusted such that only a single data transmission can be accommodated without any retries. As noted above, however, T5 is preferably arranged such that handset active slots for six active handsets can be accommodated for data transmission rates of both about 11 and 5.5 Mbps, without a change in the time interval TN.

FIG. 7D illustrates a frame structure 770 that corresponds to a scenario in which an extra handset active slot 762 is added to two previously active handset slots 722, 724 in the case where the data transmission rate is also drastically reduced. For example, the relative arrangement of slots within frame structure 770 as compared to 720 can illustrate the case in which the data transmission rate is reduced from 11 to 2 Mbps, and a third handset active slot is added. Once again, the position of T0 and T5 is not altered, so that, referring back to FIG. 8, the wakeup times for WiFi handsets 802, 804 is not changed. In this case, go to sleep time TM1 is sufficient to accord the first registered handset 802 time for one retry of data transmission. In addition, slots 724 and 742 for handsets 804 and third handset 806, respectively, only accommodate one data transmission and no retries.

In accordance with another embodiment of the present invention, handset active slots can be dynamically reassigned when an active WiFi device ceases real-time communications. Thus, referring to FIGS. 7D and 7A, the frame structure of FIG. 7D could be reconfigured when "HS2" ceases real-time communications. For example slots 722, 724, and 742 can be used to provide simultaneous voice communications for three handsets during a phone call routed through a common AP. If, during the phone call, HS2 goes on-hook, a signal is sent to the AP that indicates that slot 724 is available. Accordingly, slot 724 can be reassigned by the AP to HS3 which is in communications with the AP through slot 742. In addition, because the AP knows that only two handsets are now in real-time communications mode, it can reconfigure slot 724 and expand the maximum duration of the slot as defined by TM2, such that TM2 is moved to a point such as represented in FIG. 7A. Accordingly, the amount of retries for HS3 can be increased. If any additional handsets subsequently go off-hook to join the conversation, the active slot assignment can proceed as indicated in the progression of FIGS. 7B and 7C, with the "old" HS3 now assigned to slot 724.

In another embodiment of the present invention, dynamic reassignment of WiFi devices are employed to reassign WiFi devices when the first priority slot, e.g., slot 722 becomes unoccupied. Thus, in the scenario of FIG. 7D, when HS 1 goes on hook during a common phone call, HS2 can be reassigned to active slot 722 and HS3 reassigned to an expanded active slot 724, as represented by FIG. 7A.

FIG. 7E illustrates a frame structure 780 that adds a fourth handset active slot 782 in the case of a lower data transmission rate, as illustrated in FIG. 7D. In this case, slot 722 for handset 802 is also adjusted such that only a single data transmission can be accommodated without any retries. As noted above, however, T0 and T5 remain unchanged.

It is to be noted that, although in reality a single sleep period for a WiFi device comprises an uninterrupted interval, for a single frame interval of the frame structure depicted in FIGS. 7A-7E, only the sleep period for a device corresponding to active slot 722 extends continuously (from T6 or T0 of the subsequent frame) for the respective frame depicted. For example, for a device corresponding to active slot 724, a complete sleep period comprises a portion of a sleep period extending between T0 and T5 that occurs before wake-up at T5, and a portion of the sleep period that occurs between T6 and T0 of a subsequent frame.

Figure 10:
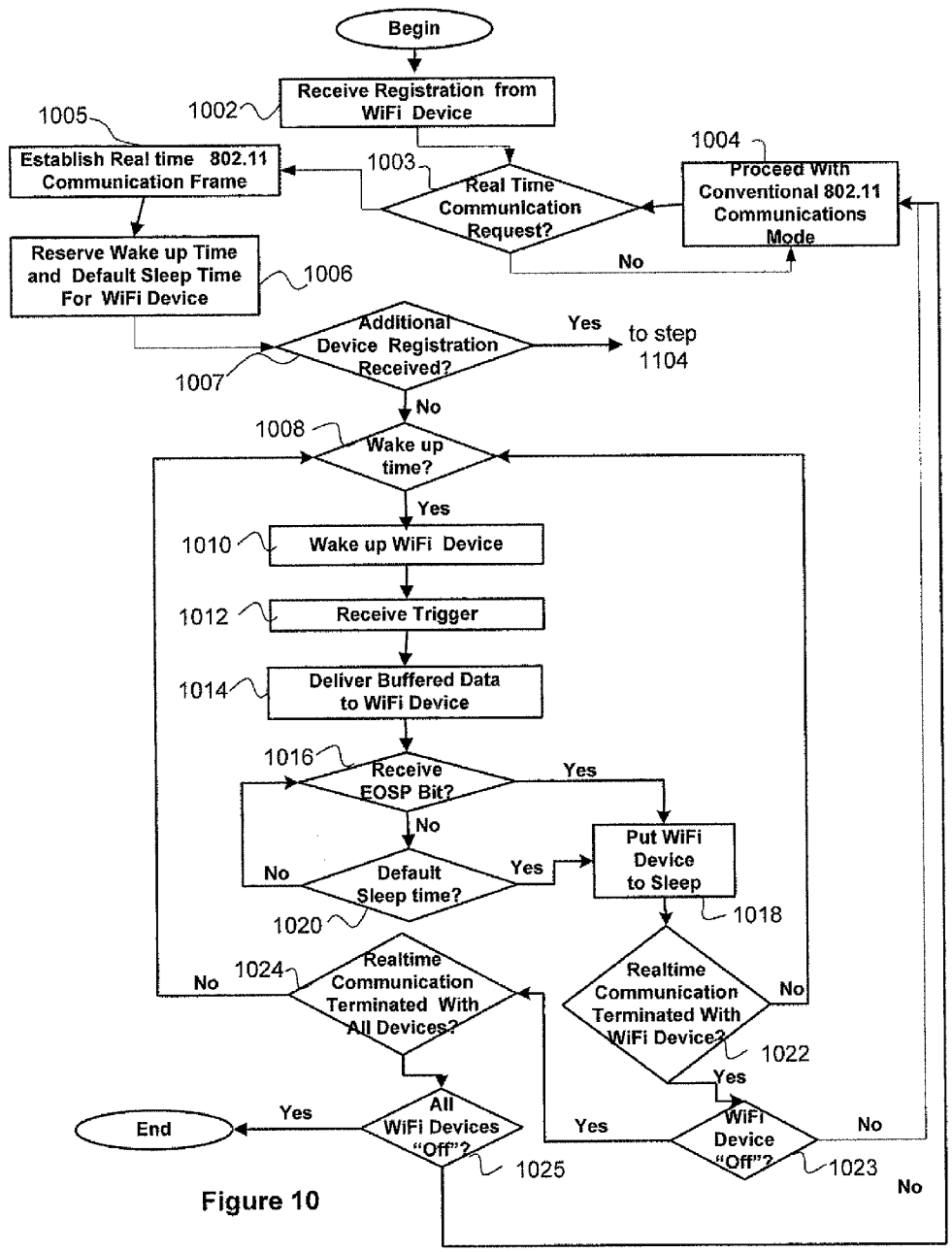
FIG. 10 illustrates exemplary steps in a method for enhanced communications in a WiFi system, according to another embodiment of the present invention.

FIG. 10 illustrates exemplary steps in a method for enhanced communications in a WiFi system, according to another embodiment of the present invention. In step 1002, a registration is received from a WiFi device (handset), for example, when the WiFi device powers on. When the registration from the WiFi handset is received at a base unit of a WiFi system (AP), the WiFi handset indicates to the base unit that in a real-time communications mode, it wishes to enable a mechanism to allocate an active period and sleep period for the WiFi handset within each frame. For example, the WiFi handset indicates that it wishes to enable an Unscheduled Automatic Power Save Deliver (U-APSD) mechanism to control active and sleep periods. The base unit then configures communication to be both trigger and delivery enabled during real-time communications.

In step 1003, if a request for real-time communication is not received, the process moves to step 1004.

In step 1004, the WiFi device proceeds in a conventional communications mode used for non-real-time applications. For example, after registering, the WiFi device may continue to receive data through a conventional 802.11 data link from the AP that it is registered with.

If, in step 1003, a real-time communications request is received from the registered WiFi device, a real-time 802.11 communications mode is initiated, as embodied in steps 1005 and 1006. In step 1005, a real-time frame (or communication frame) is established. The real-time frame is established by the AP to facilitate exchange data for applications such as voice or streaming audio. The real-time frame is characterized by a frame interval, which corresponds to the time between sending of successive data packets as described above with respect to FIG. 7. For example, in a WiFi system in which WiFi handsets are used as cordless telephones, the frame interval corresponds to the time between sending of successive audio packets. In an exemplary embodiment of the present invention, this frame interval is 10 ms.

In step 1006, a regular wake-up time is reserved for the first WiFi handset. Preferably, the wake-up time corresponds to a fixed point within each communications frame at which the first WiFi handset is to wake-up. For example, an AP receiving a telephone call set-up for the first WiFi handset reserves a wake-up time at the time of call set-up. After receiving the wake-up time, the first WiFi handset can set an internal clock to wake itself up at the wake-up time within each subsequent frame. In addition, a default sleep time is set relative to the wake-up time which signifies the point at which the first WiFi handset is to enter low power or standby power operation. The wake-up time and default sleep time serve to define a default active slot, which defines a maximum period for full power operation of the WiFi handset within a communications frame. Thus, during operation, if the first WiFi handset receives no EOSP bit indicating the onset of sleep mode, at a time defined by the default sleep time, the first WiFi handset nevertheless enters low power or standby power mode during each frame. The default active slot thus corresponds to a time interval within each frame interval that is available for the first WiFi handset to operate at full power to enable transmitting and receiving data. In a preferred embodiment of the present invention, the actual duration of the active slot can vary based on the U-APSD protocol discussed above, but does not exceed the duration of the default wake-up slot. In other words, a sleep trigger time can be established within each communications frame in which an EOSP bit is scheduled to be delivered. The sleep trigger time can thus be set to occur any time before the default sleep time. Thus, within every communication frame, the first WiFi handset operates at full power during the active slot and at reduced power during the remainder of the frame interval.

Preferably, the default active slot is arranged so as not to overlap in time with any other wake-up slots that may be arranged with additional WiFi devices linked to the AP.

In step 1007, if an additional WiFi request for real-time mode is received, the method moves to step 1104 of FIG. 11, described in detail below.

If no additional request for real-time mode is received the process moves to step 1008. In step 1008, when a wakeup time arrives for a WiFi device, the method moves to step 1010. For example, the wake-up time could correspond to that of the first WiFi device.

In step 1010, the WiFi device is awakened. For example, the WiFi device could be a handset that is awakened based on an internal clock in the handset. At the time of registration (association) with the AP, the handset and AP exchange information that sets the communications frame and the wake-up time within each frame for the WiFi handset. Accordingly, the WiFi handset knows that it is to wake up periodically at the pre-defined wake-up times that can be stored and initiated when the internal clock indicates that the wake-up time has arrived.

In step 1012 a data delivery trigger is received. The trigger could be, for example, a voice packet received from the WiFi device.

In step 1014, buffered data is delivered to the WiFi device over the WiFi link between the device and AP. The delivery takes place during the active slot. Within the active slot the device can send and receive data from the AP. Depending on other parameters discussed above, data packets may be sent in retries multiple times within an active slot.

In step 1016, if an EOSP bit is received, the method moves to step 1018. For example, after receiving and sending information, the AP may indicate to the WiFi device that it has successfully received data sent from the handset and that no further data is to be sent.

In step 1018, the WiFi device is put to into a standby or reduced power mode.

If an EOSP bit is not received, the method moves to step 1020. In step 1020, if the default sleep time has been reached, the method moves to step 1018. If the default sleep time has not been reached, the method returns to step 1016.

In step 1022, if real time communication has been terminated between the WiFi device and AP, for example, if the WiFi device goes on hook after a telephone call, the method moves to step 1023. If the real time communication with the WiFi device is not terminated, the process returns to step 1008 where the arrival of a subsequent wake-up time triggers another process of waking up of a WiFi device.

In step 1023, if the WiFi device has powered down, the process moves to step 1024. If the WiFi device is still powered on, the process moves to step 1004 where the WiFi device proceeds in a conventional 802.11 communications mode.

In step 1024, if real-time communications are terminated with all WiFi devices registered to an AP, the process moves to step 1025. If real-time communications mode persists with at least one other WiFi device, the process moves to step 1008 and cycles through steps 1008-1022 for each device still in real-time communications mode.

In step 1025, if not all WiFi devices are powered off, the process returns to step 1004 for devices still powered on. Subsequently, the devices can re-initiate a request for real-time communications, for example, by going off-hook to participate in a telephone call. If all devices are powered off, the process ends.

Preferably, the above method can be employed between multiple WiFi devices that are in communication with a common AP at the same time. The use of the term "same time" (or simultaneously), unless otherwise indicated, is meant to indicate that multiple WiFi devices can interact with an AP over the same long term time interval, for example measured in seconds or minutes, even if actual communications within a 10 ms frame are arranged in mutually exclusive time slots. Thus, the method of FIG. 10 can be employed simultaneously with many WiFi handsets, as long as active slot space is available, as illustrated above, in FIGS. 7A-7E.

Figure 11:
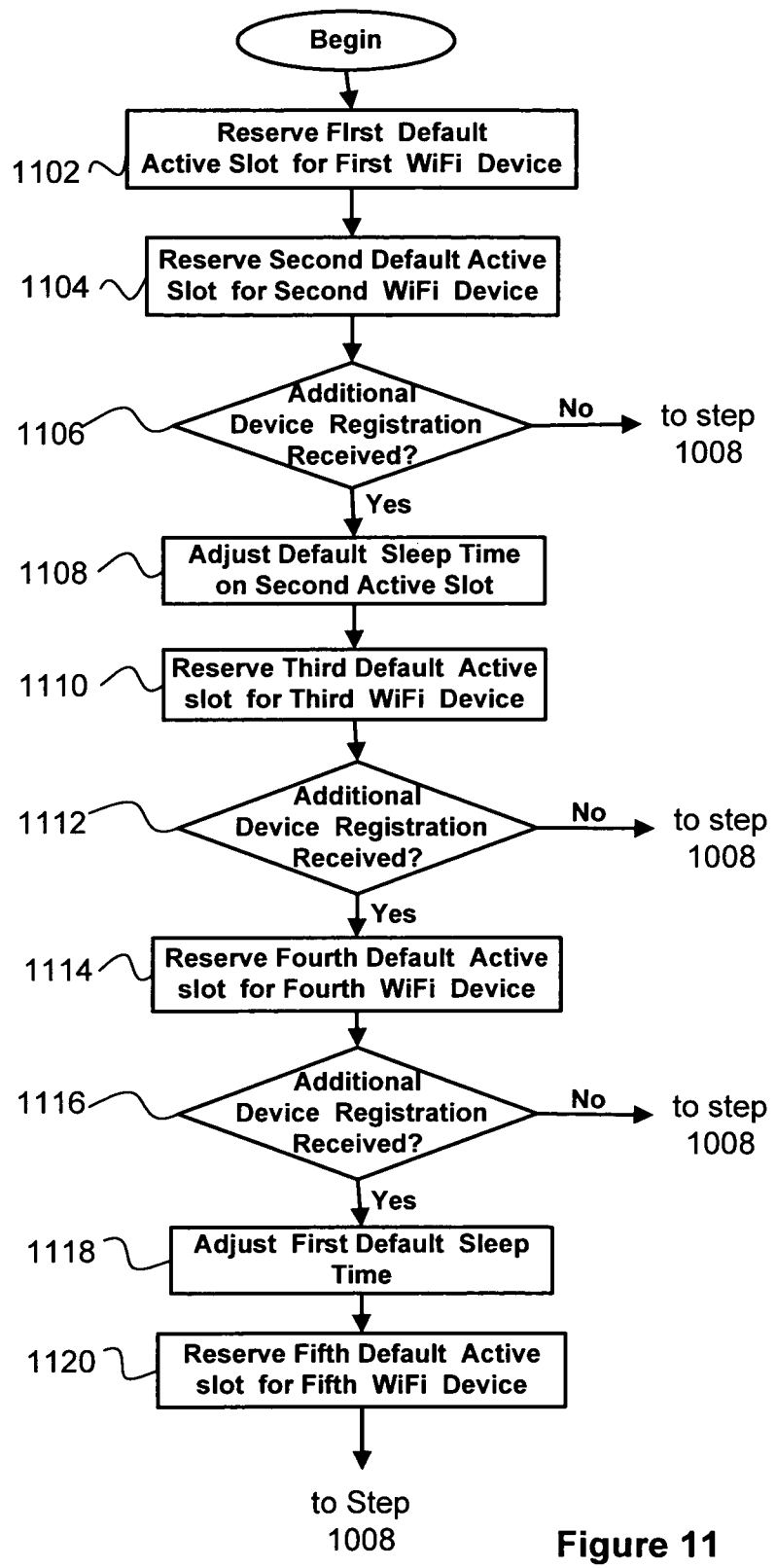
FIG. 11 illustrates exemplary steps in a method for enhanced communications in a WiFi system, according to another embodiment of the present invention.

FIG. 11 illustrates exemplary steps in a method for enhanced communications in a WiFi system, according to another embodiment of the present invention.

In step 1102, a first default active slot is reserved for a first WiFi device. For example, as described above with respective to FIG. 10, the active slot could be reserved when real-time communications mode is initiated for the first WiFi device.

In step 1104, a second default active slot is reserved for a second WiFi device, for example, after initiation of a real-time communications mode with the second WiFi device. Preferably, the first and second default active slots do not overlap in time. Accordingly, the first and second WiFi devices can actively communicate with an AP without interfering with one another. Preferably, the duration of the first and second active device slots are such that a maximum of retries can be performed during the time a respective WiFi device is active. Thus, the spacing of wake-up times between the first and second default active slot is arranged so that the first default active slot provides a maximum amount of retries for the first WiFi device. In an exemplary embodiment of the present invention, both first and second active device slots accommodate two retries within a frame interval of about 10 ms using data transmission rates of about 5-12 Mbps.

In step 1106, if no additional device requests real-time communications mode initiation, the process moves to step 1008. If an additional request for real-time communications mode is received, the process moves to step 1108.

In step 1108, the default sleep time is adjusted on the second active slot. For example, referring to FIGS. 7A and 7B, the default sleep time TM2 for slot 724 is adjusted to an earlier time to accommodate the addition of handset 3. After adjustment of the default sleep time, the amount of retries available for data transmission for the second WiFi device within slot 724 is reduced. However, the amount of retries available for the first WiFi device remains unchanged.

In step 1110, a third default active slot is reserved for a third WiFi device, as illustrated, for example, in FIG. 7B for handset 3. In this case, the amount of retries available to a third device registering in a third active slot is no greater than that of the second WiFi device. For example, the third active default slot can be arranged so that it begins at a time that occurs before the unadjusted default sleep time of the second active slot (see TM2 of FIG. 7A), but after the adjusted default sleep time of the second active slot (see TM2 of FIG. 7B).

In step 1112, if no additional device requests real-time communications mode are received, the process moves to step 1008. If an additional real-time communications mode request is received, the process moves to step 1114.

In step 1114, a fourth default active slot is reserved for a fourth WiFi device, as illustrated, for example, in FIG. 7B for handset 4. In this case, the amount of retries available to a fourth device registering in a fourth active slot is no greater than that of the second WiFi device.

In step 1116, if no additional device requests real-time communications mode, the process moves to step 1008. If an additional real-time communications mode request is received, the process moves to step 1118.

n step 1118, the default sleep time is adjusted on the first active slot. For example, referring to FIGS. 7B and 7C, the default sleep time TM1 for slot 722 is adjusted to an earlier time to accommodate the addition of handset 5. After adjustment of the default sleep time, the amount of retries available for data transmission for the first WiFi device is reduced, as illustrated in FIG. 7C.

In step 1120, a fifth default active slot is reserved for a fifth WiFi device, as illustrated, for example, in FIG. 7C for handset 5. In this case, the amount of retries available to a fifth device registering in a fifth active slot is no greater than that of the other WiFi devices.

In other embodiments of the present invention, the method illustrated in FIG. 11 can be extended to accommodate additional WiFi devices, as suggested by FIG. 7C where six handset slots are available to establish communication with six devices simultaneously.

In accordance with the method of FIGS. 10 and 11, a first WiFi device to request real-time mode initiation (requesting device) is accorded priority in terms of the amount of redundancy (retries) accorded communications between the WiFi device and AP. This provides for enhanced quality of real-time communications for the first requesting device while still permitting other devices to link with the AP in the real-time communications mode. Thus, for example, when more than one WiFi handset desire to link to a single active call, an AP can mix the audio data to and from handsets so that the WiFi handset users can listen and talk to each other.

The method also provides a mechanism to ensure that a plurality of WiFi devices can receive and send data on a "real-time" basis, for example, every 10 ms, without having to spend unnecessary time in a full power state listening for incoming data. In addition, because all registered WiFi devices within a communications range of an AP have their active communications scheduled in separate time slots, a registered WiFi device employing 802.11 communications protocol potentially spends less time "backing off" from radio traffic that might otherwise be present during the active period of the registered WiFi device.

Additionally, as discussed above in reference to FIGS. 7-7E, management of communications is simplified by requiring a minimum of changes in active slot configuration when the amount of active WiFi devices is altered.

In summary, in one embodiment of the present invention method for enhanced payload protection in a WiFi system includes the steps of: a) receiving a first data packet in a buffer; b) transmitting the first data packet and a second data packet in a first frame body, the data packets transmitted between a WiFi terminal and access point (AP); c) transmitting the first data packet and a third data packet in a second frame body, the data packets transmitted between the WiFi terminal and access point (AP); d) repeating the steps a) through c) wherein two copies of each data packet are transmitted in subsequent frame bodies; and e) forwarding a best copy of the two copies of each data packet to a receiver.

In another embodiment of the present invention, a method for enhanced payload protection in a WiFi system includes the steps of: a) Storing a data packet in a buffer; b) Storing an FEC packet based on the data packet in the buffer; c) transmitting the data packet and FEC packet between a WiFi terminal and access point; d) applying the FEC packet to the data packet to produce a corrected data packet; and e) forwarding the corrected data packet to a receiver.

In a further embodiment of the present invention, a method for enhancing communications over a WiFi link includes the steps of: a) transmitting a data payload over a first payload; b) detecting an error using an FCS packet; c) sending the data payload to a packet correction layer; d) determining the nature of the error; e) determining that an IP address error has occurred; and f) recovering a destination for the data payload based on a unit ID packet.

In still another embodiment of the present invention, a method for enhanced communications in a WiFi network includes the steps of a) receiving registration from a WiFi device; b) establishing a real-time communications mode with the WiFi device that includes the steps of and access point (AP); c) establishing a communications frame with the WiFi device and; d) arranging within the frame an active timeslot for transmission of audio data packets between the WiFi device and AP; e) receiving a trigger from the WiFi device; and f) delivering buffered audio data to the WiFi device, wherein the active timeslot is configured to avoid overlap with active timeslots of other registered WiFi devices.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A WiFi communication system, comprising:
a WiFi terminal device configured to generate a request for a real-time communication mode; and
a dedicated access point device configured to establish a real-time communications between the dedicated access point device and the WiFi terminal device in response to the request for the real-time communication mode from the WiFi terminal device;
wherein the real-time communications comprises a frame for data transmission between the WiFi terminal device and the dedicated access point device;
wherein the frame has a fixed duration and comprises an active slot dedicated to the WiFi terminal device, a sleep period associated with the WiFi terminal device, and a command slot configured for transmission of command packets;
wherein the active slot comprises one or more data packet payload, each data packet payload comprising a data packet and a unit ID packet configured to carry information that uniquely identifies the WiFi terminal device;
wherein an active period dedicated to the WiFi terminal device starts at a same time in each frame of a sequence of frames;
wherein the dedicated access point device is configured to arrange a second active slot associated with a second WiFi terminal device within the frame and dynamically adjust a duration of the active slot dedicated to the WiFi terminal device and a number of retries within the active slot to accommodate the second active slot for the second WiFi terminal device within the frame;
wherein the dedicated access point device is configured to arrange a first wakeup time and a second wakeup time such that a change in a transmission rate between active WiFi terminal devices and the dedicated access point device is accommodated without adjusting the second wakeup time; and
wherein the dedicated access point device is further configured to detect error location and specific error type in a received frame, wherein the error types include address error and non-address error.

2. The WiFi communication system of claim 1, wherein the sleep period is configured to start when the WiFi terminal device receives an end of service period (EOSP) bit from the dedicated access point device.

3. The WiFi communication system of claim 1, wherein the sleep period is configured to start at a default sleep time if an end of service period (EOSP) bit is not received.

4. The WiFi communication system of claim 1, wherein each frame of the sequence of frames comprises:
   a first wakeup time that marks a start of the active slot of the WiFi terminal device; and
   a second wakeup time that marks a start of another active slot of another WiFi terminal device,
   wherein the active slots do not overlap in time.

5. The WiFi communication system of claim 4, wherein the dedicated access point device is further configured to adjust a duration of the another active slot, but retain the second wakeup time to accommodate additional active time slots for additional WiFi devices in each frame of the sequence of frames.

6. The WiFi communication system of claim 1, wherein the dedicated access point device is further configured to dynamically reassign the active slot to another WiFi terminal device in response to the WiFi terminal device ceasing real-time communications.

7. The WiFi communication system of claim 1, wherein the WiFi terminal device is configured to maintain an active state only during its respective active slot.

8. The WiFi communication system of claim 1, wherein the WiFi terminal device is configured to maintain a low or standby power state in its respective sleep period.

9. A method for real-time communications in a WiFi communications system, the method comprising:
   receiving a real-time communications request from a WiFi device; and
   in response to said receiving, assigning an active slot within a frame of a sequence of frames having a fixed duration, to the WiFi device, the active slot comprising one or more data packet payload, each data packet payload comprising a data packet and a unit ID packet configured to carry information that uniquely identifies the WiFi device, wherein the frame comprises a wakeup time and a sleep time within a frame of a sequence of frames having a fixed duration;
   wherein said assigning comprises setting the wakeup time for the active slot such that the wakeup time corresponds to a same time in each frame of the sequence of frames;
   wherein a dedicated access point device is configured to arrange a second active slot associated with a second WiFi device within the frame and dynamically adjust a duration of the active slot dedicated to the WiFi device and a number of retries within the active slot to accommodate the second active slot for the second WiFi device within the frame; and
   wherein the dedicated access point device is further configured to detect error location and specific error type in a received frame, wherein the error types include address error and non-address error.

10. The method of claim 9, further comprising: delivering an end of service period (EOSP) bit to the WiFi device to terminate the active slot of the WiFi device prior to the sleep time for the WiFi device.

11. The method of claim 9, further comprising delivering data to the WiFi device during the active slot for the WiFi device.

12. The method of claim 9, further comprising:
   receiving another request for real-time communications from another WiFi device; and
   in response to said receiving another request, assigning another active slot to the another WiFi device, the another active slot comprising another wakeup time and another sleep time within each frame of the sequence of frames.

13. The method of claim 9, further comprising terminating the active slot period at the sleep time if an end of service period (EOSP) bit is not received before the sleep time.

14. The method of claim 9, further comprising dynamically reassigning the active slot to another WiFi device that has requested real-time communication when the WiFi device ceases real-time communications.

* * * * *